United States Patent
Evans, V et al.

(10) Patent No.: US 9,774,798 B1
(45) Date of Patent: Sep. 26, 2017

(54) APPARATUS AND METHOD FOR A WIDE FIELD OF VIEW IMAGE SENSOR

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US); Rebecca Schultz Zavin, Portola Valley, CA (US)

(73) Assignee: ESSENTIAL PRODUCTS, INC., Palo Alto, CA (US)

(*) Notice: Subject to any disclaimer, the term of this patent is extended or adjusted under 35 U.S.C. 154(b) by 0 days.

(21) Appl. No.: 15/204,956

(22) Filed: Jul. 7, 2016

Related U.S. Application Data

(60) Provisional application No. 62/356,434, filed on Jun. 29, 2016.

(51) Int. Cl.
| | |
|---|---|
| *H04N 5/225* | (2006.01) |
| *H04N 7/00* | (2011.01) |
| *G02B 13/06* | (2006.01) |
| *H04N 5/341* | (2011.01) |
| *H04N 5/232* | (2006.01) |
| *G02B 26/04* | (2006.01) |
| *G02B 26/08* | (2006.01) |

(52) U.S. Cl.
CPC .......... *H04N 5/3415* (2013.01); *G02B 13/06* (2013.01); *G02B 26/04* (2013.01); *G02B 26/08* (2013.01); *H04N 5/23238* (2013.01); *G02B 26/0833* (2013.01); *G02B 26/0883* (2013.01)

(58) Field of Classification Search
CPC .. H04N 5/3415; H04N 5/23238; G02B 13/06; G02B 26/08; G02B 26/0833; G02B 26/0883
USPC .......................................................... 348/61
See application file for complete search history.

(56) References Cited

U.S. PATENT DOCUMENTS

| | | | | |
|---|---|---|---|---|
| 2003/0076423 A1* | 4/2003 | Dolgoff | ................. | G03B 35/16 348/222.1 |
| 2010/0045773 A1 | 2/2010 | Ritchey et al. | | |

OTHER PUBLICATIONS

International Search Report and Written Opinion for application PCT/US17/37156 dated Jul. 7, 2017, pp. 1-9.

* cited by examiner

*Primary Examiner* — Hee-Yong Kim
(74) *Attorney, Agent, or Firm* — Perkins Coie LLP

(57) ABSTRACT

Methods and systems described herein address the issue of how to efficiently capture an image circle within an image sensor associated with a wide field of view camera. In one embodiment, a processor obtains several criteria, such as a plurality of sizes of a plurality of image circles, a minimal portion of the image circle to be recorded by the image sensors, and a minimal portion of the image sensors engaged in recording the image. Based on these criteria, the processor determines a number of image sensors, a number of image sensor sizes, and a number of image sensor shapes. In another embodiment, the processor receives additional criteria, such as the desired aspect ratio and the desired shape associated with the image sensor. Based on these criteria, the processor determines a number of image sensors and a number of image sensor sizes.

24 Claims, 12 Drawing Sheets

APPARATUS AND METHOD FOR A WIDE FIELD OF VIEW IMAGE SENSOR

CROSS-REFERENCE TO RELATED APPLICATIONS

This application claims priority to the U.S. Provisional Patent Application Ser. No. 62/356,434, filed Jun. 29, 2016, which is incorporated herein by reference in its entirety.

TECHNICAL FIELD

The present application is related to image sensors and, more specifically, to methods and systems directed at wide field of view image sensors.

BACKGROUND

In traditional cameras, a lens associated with the camera forms an image circle that is recorded by an image sensor. The image circle is the cross section of the cone of light transmitted by one or more lenses. When light strikes a perpendicular target such as an image sensor, the light forms a circle of light, the image circle. Various image sensor aspect ratios may be used: 3:2, 4:3, 16:9, etc. Traditionally, the image sensor fits inside the image circle. When the image sensor is contained inside the image circle, the image sensor does not record the full image circle produced by the lens. With the advent of wide field of view cameras, such as 360° cameras, the edges of the image circle not recorded by the traditional lens become relevant in creating a wide field of view image, and the issue arises of how to efficiently capture the image circle within an image sensor.

SUMMARY

Methods and systems described herein address the issue of how to efficiently capture the image circle within the image sensor associated with a wide field of view camera. In one embodiment, a processor obtains several criteria, such as a plurality of sizes associated with a plurality of image circles, a minimal portion of the image circle to be recorded by the image sensors, and a minimal portion of the image sensors engaged in recording the image. Based on these criteria, the processor determines a number of image sensors, a number of image sensor sizes and a number of image sensor shapes associated with the wide field of view camera. In another embodiment, the processor can receive additional criteria, such as the desired aspect ratio and the desired shape associated with image sensor. Based on these criteria, the processor determines a number of image sensors and a number of image sensor sizes associated with the wide field of view camera.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
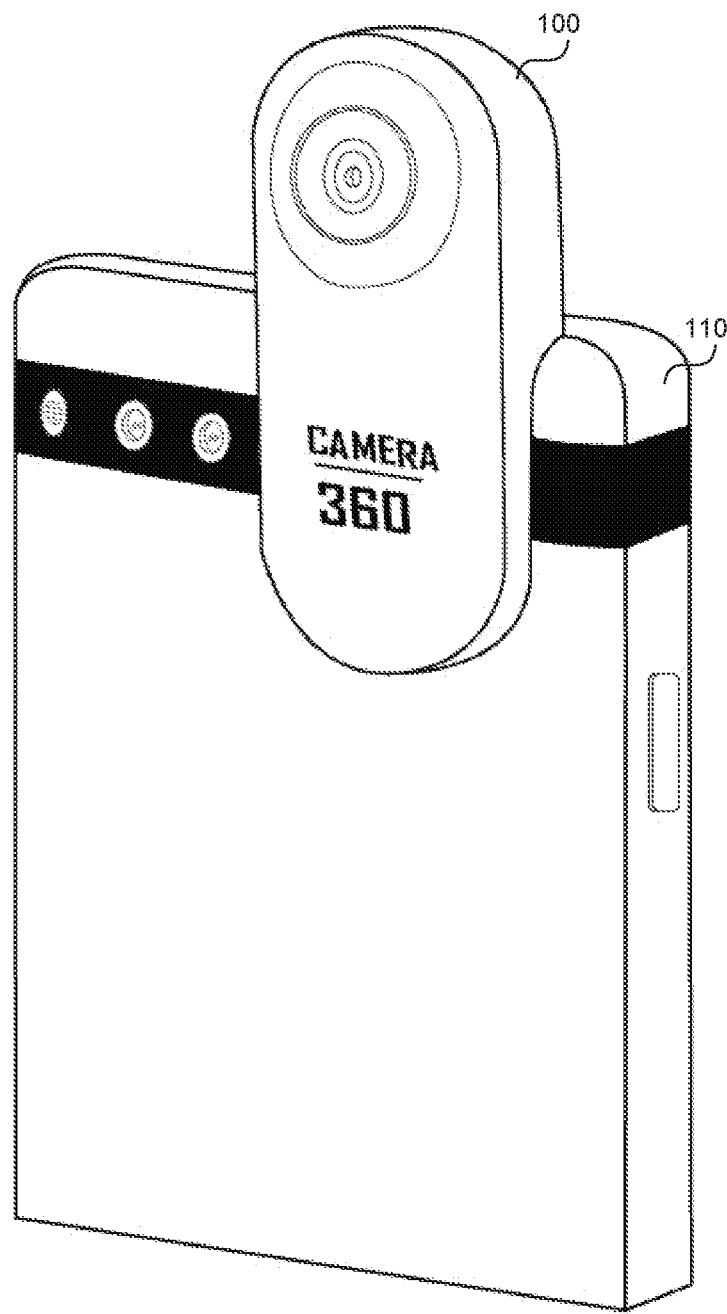
FIG. 1 shows a wide field of view camera coupled to a mobile device, according to one embodiment.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed therebetween, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Technology

Methods and systems described herein address the issue of how to efficiently capture the image circle within the image sensor associated with a wide field of view camera. In one embodiment, a processor obtains several criteria, such as a plurality of sizes associated with a plurality of image circles, a minimal portion of the image circle to be recorded by the image sensors, and a minimal portion of the image sensors engaged in recording the image. Based on these criteria, the processor determines a number of image sensors, a number of image sensor sizes and a number of image sensor shapes associated with the wide field of view camera. In another embodiment, the processor can receive additional criteria, such as the desired aspect ratio and the desired shape associated with the image sensor. Based on these criteria, the processor determines a number of image sensors and a number of image sensor sizes associated with the wide field of view camera.

FIG. 1 shows a wide field of view camera coupled to a mobile device, according to one embodiment. The camera 100 can be an accessory attached to the mobile device 110, can be a stand-alone camera, or can be a camera built into the mobile device 110, or any combination thereof. The mobile device 110 can be a cell phone, a tablet, a personal digital assistant, a smart watch, a Fitbit bracelet, etc.

Figure 2:
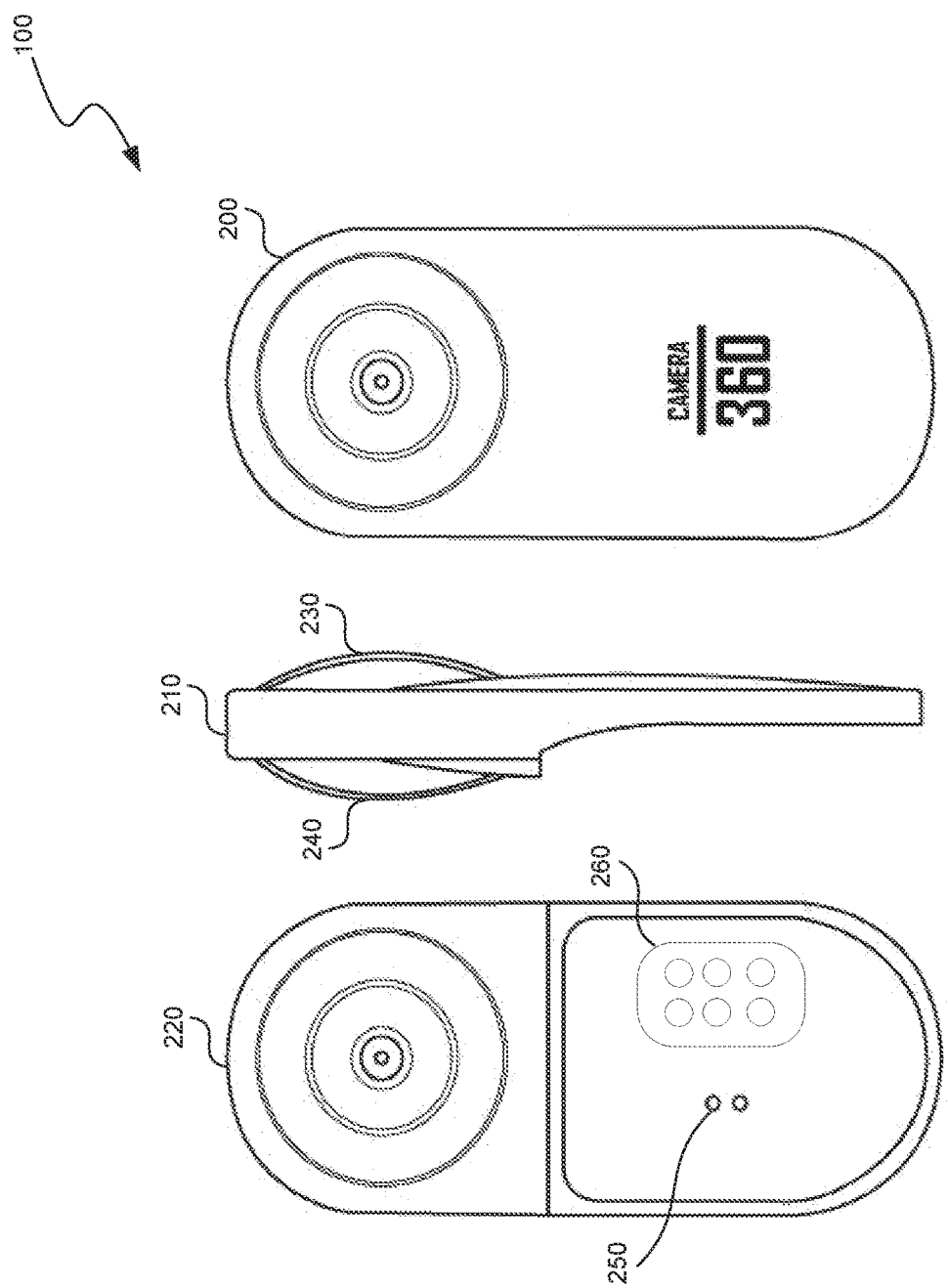
FIG. 2 shows the front, side, and back views of the wide field of view camera, according to one embodiment.

FIG. 2 shows front 200, side 210, and back 220 view of the wide field of view camera, according to one embodiment. The camera includes a plurality of lenses 230, 240 which record a 360° image around the camera 100. The camera 100 includes connectors 250, such as USB connectors, which can be used to couple the camera 100 to a mobile device. The camera 100, in addition to the connectors 250, or as an alternative to the connectors 250, can include a control panel 260, which allows the camera 100 to be a stand-alone camera. The control panel 260 receives inputs from a user regarding exposure time, aperture size, whether to take a video or a picture, etc.

Figure 3A:
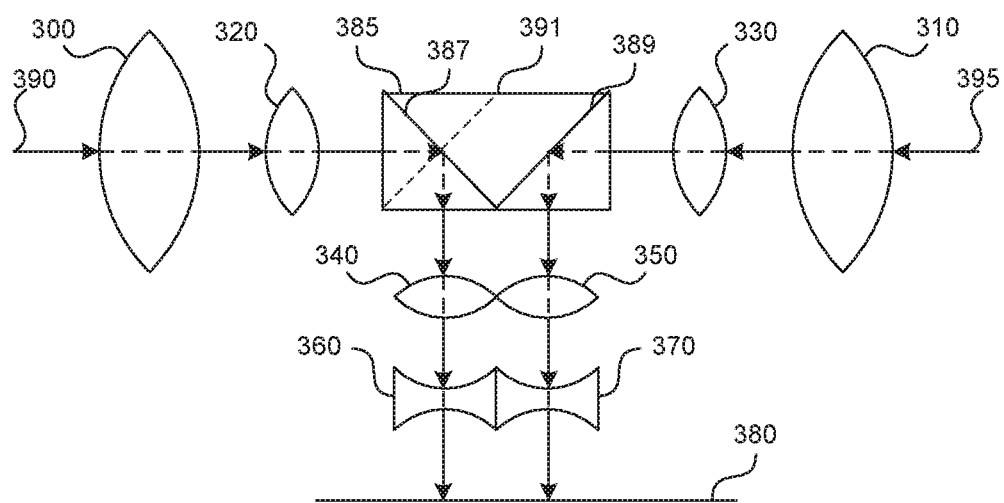
FIG. 3A shows the internal optics of a wide field of view camera, according to one embodiment.

FIG. 3A shows the internal optics of a wide field of view camera, according to one embodiment. Wide angle lenses 300 and 310 receive a plurality of light beams 390, 395 from up to 180° around the camera. Convex lenses 320 and 330 receive the plurality of light beams 390, 395 from the plurality of wide angle lenses 300, 310, and focusing a light beam in the plurality of light beams 390, 395 onto a light deflector 385.

The light deflector 385 receives the plurality of light beams 390, 395 from the first plurality of convex lenses 320, 330, and the light deflector 385 changes a direction of the plurality of light beams 390, 395 to direct the plurality of light beams 390, 395 to a second plurality of convex lenses 340, 350. The light deflector 385 can be a prism or a mirror. The light deflector 385 can be stationary, or the light deflector 385 can be actuated by micro-electromechanical systems (MEMS) devices, nano-electromechanical systems (NEMS) devices, pico-electromechanical systems (PENS) devices, etc. For example, the light deflector 385 can be a single mirror or a prism that changes positions between position 387, deflecting the light beam 390, and position 389, deflecting the light beam 395. In another embodiment, the light deflector 385 can assume position 391, deflecting the light beam 395 to the lenses 340, 360, thus obviating the need for lenses 350, 370.

The second plurality of convex lenses 340, 350 receives the plurality of light beams 390, 395 from the light deflector 385, and focuses the plurality of light beams 390, 395 onto a plurality of concave lenses 360, 370.

The plurality of concave lenses 360, 370 receives the plurality of light beams 390, 395 from the second plurality of convex lenses 340, 350, and the plurality of concave lenses 360, 370 directs the plurality of light beams 390, 395 to an image sensor 380.

The plurality of lenses 320-370 can also act to magnify the incoming image, or to reduce the incoming image.

The image sensor 380 receives the plurality of light beams 390, 395 from the plurality of concave lenses 360, 370 and forms a plurality of images corresponding to the wide angle lenses 300, 310. The image sensor 380 can have various sizes, such as 16×9 mm and 4×3 mm.

A processor, connected to the image sensor 380, receives the plurality of images and creates an image comprising a 360° view around the camera. Software associated with the processor fixes any lens artifacts and/or distortions, and correlates the two images to create a 360° view around the camera.

Figure 3B:
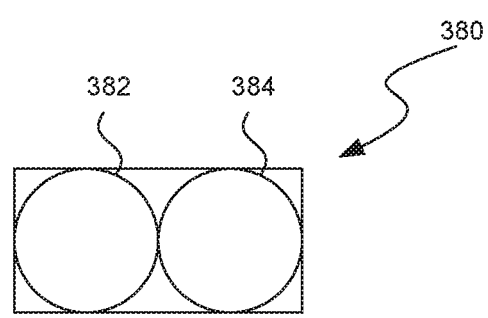
FIG. 3B shows the images formed by the image sensor, according to one embodiment.

FIG. 3B shows the images formed by the image sensor 380, according to one embodiment. The image sensor 380 can form a plurality of image circles 382, 384 corresponding to the wide angle lenses 300, 310. The size of the image sensor 380 can be 16×9 mm. In another embodiment, in the case of an actuated light deflector 385 assuming positions 387 or 391, the image sensor 380 can form a single image circle 482, as depicted in FIG. 4B. The single image circle 482 alternates between corresponding to the image associated with the wide angle lens 300, and the image associated with the wide angle lens 310.

Figure 4A:
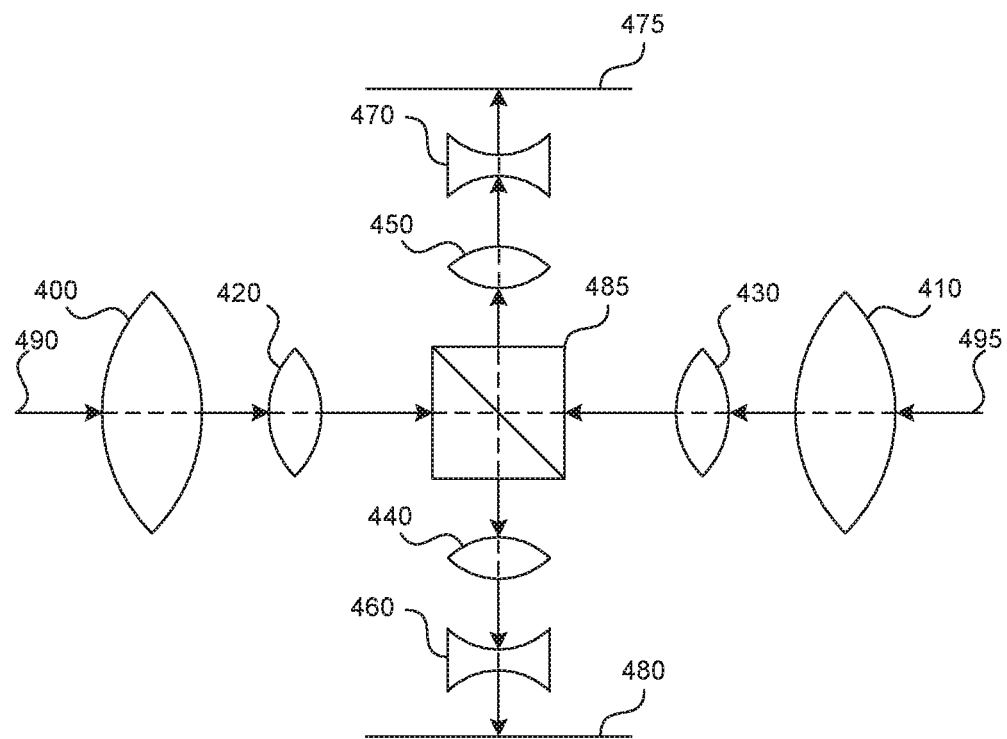
FIG. 4A shows the internal optics of a wide field of view camera, according to another embodiment.
Figure 4B:
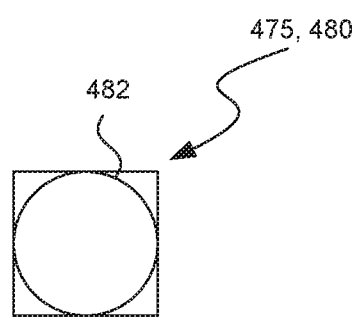
FIG. 4B shows the image formed by the plurality of photo sensor arrays, according to one embodiment.

FIG. 4A shows the internal optics of a wide field of view camera, according to another embodiment. Lenses 400-430 correspond to the lenses 300-330 in FIG. 3A, respectively. Light deflector 485 receives the plurality of light beams 490, 495 from the first plurality of convex lenses 420, 430, and the light deflector 485 changes a direction of the plurality of light beams 490, 495 to direct the plurality of light beams 490, 495 to a second plurality of convex lenses 440, 450. The light deflector 485 can be a prism or a mirror. The light deflector 485 can be stationary, or the light deflector 485 can be actuated by micro-electromechanical systems (MEMS) devices, nano-electromechanical systems (NEMS) devices, pico-electromechanical systems (PENS) devices, etc.

Similarly to FIG. 3A, the convex lenses 440, 450 and the concave lenses 460, 470 focus the light beams 490, 495 to the plurality of photo sensor arrays 475, 480. The plurality of photo sensor arrays 475, 480 receives the plurality of light beams 490, 495 from the plurality of concave lenses 460, 470 and forms a plurality of images corresponding to the first plurality of convex lenses 400, 410. The plurality of lenses 420-470 can also act to magnify the incoming image, or to reduce the incoming image.

FIG. 4B shows the image circle 482 formed by the plurality of image sensors 475, 480, according to one embodiment. The plurality of image sensors 475, 480 can have various sizes, such as 4×3 mm.

Figure 5:
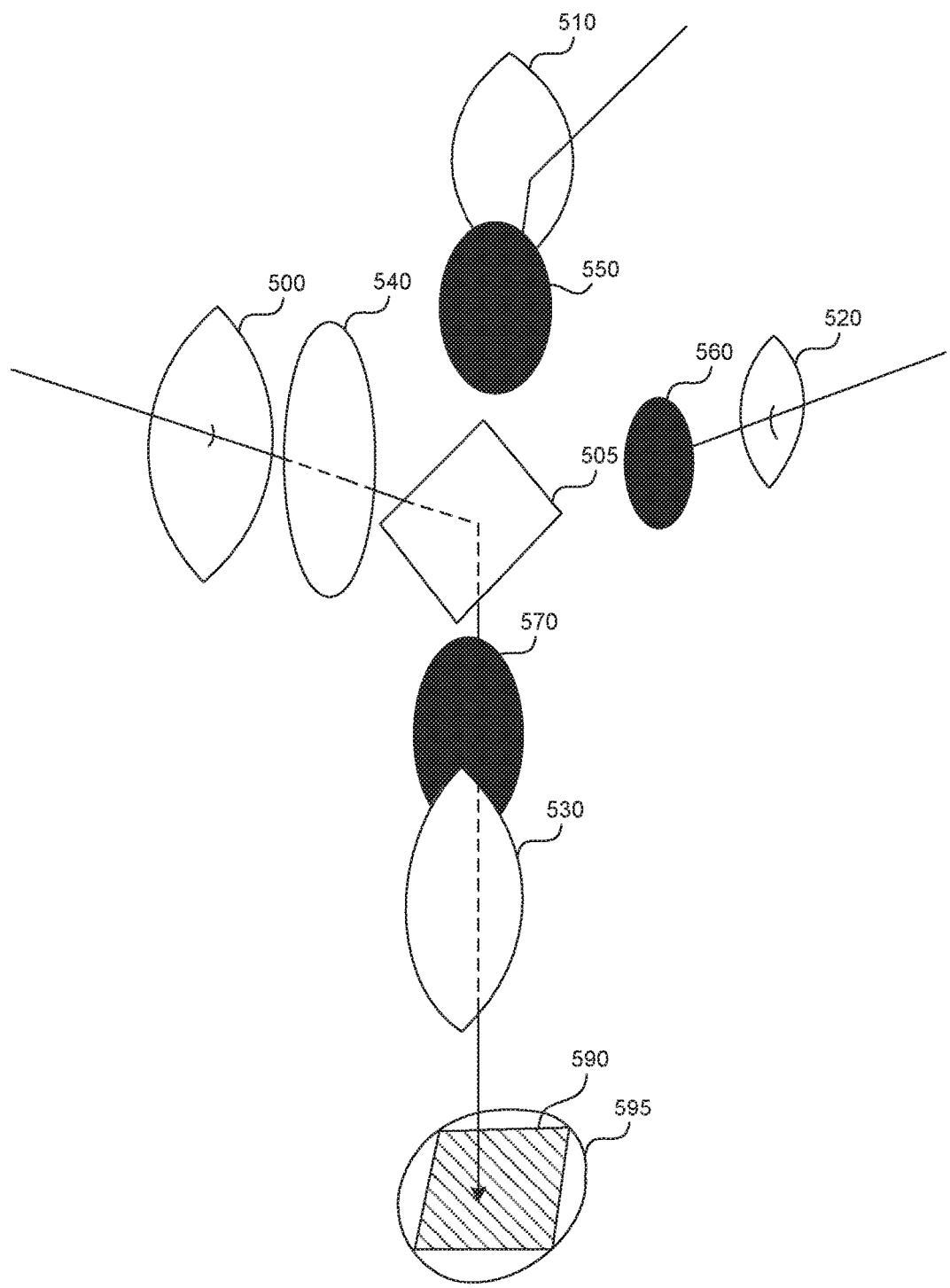
FIG. 5 shows the internal optics of a wide field of view camera, including an actuated light deflector, according to one embodiment.

FIG. 5 shows the internal optics of a wide field of view camera, including an actuated light deflector, according to one embodiment. A plurality of lenses 500, 510, 520, 530 associated with the camera can include lenses of various sizes. Each lens in the plurality of lenses 500, 510, 520, 530 forms an image circle, which can be reflected onto the one or more image sensors 590. The one or more image sensors 590 includes an active image sensor portion configured to record the image formed by the plurality of lenses 500, 510, 520, 530. In FIG. 5, the active image sensor portion includes the whole one or more image sensors 590 because the image circle 595 covers the whole one or more image sensors 590. The image circle 595 also includes an active image circle portion, which is the portion of the image circle recorded by the one or more image sensors 590. In FIG. 5, the active image circle portion is the shaded area corresponding to the one or more image sensors 590, because the shaded area is recorded by the one or more image sensors 590.

Each lens in the plurality of lenses 500, 510, 520, 530 can have a corresponding shutter in the plurality of shutters 540, 550, 560, 570. The plurality of shutters 540, 550, 560, 570 can operate independently of each other, or can operate in unison. Each shutter in the plurality of shutters 540, 550, 560, 570 has at least two states. In the first state, the shutter in the plurality of shutters 540, 550, 560, 570 allows light to pass between a lens in the plurality of lenses 500, 510, 520, 530 and a light deflector 505. In the second state, the shutter in the plurality of shutters 540, 550, 560, 570 blocks light from passing between a lens in the plurality of lenses 500, 510, 520, 530 and the light deflector 505. In FIG. 5, the shutter 540 allows the passage of light between the lens 500 and the light deflector 505, while shutters 550, 560, 570 block the passage of light between the lenses 510, 520 530 and the light deflector 505.

The light deflector 505 is disposed proximate to the plurality of lenses 500, 510, 520, 530. The light deflector 505 reflects the incoming image circle from a lens in the plurality of lenses 500, 510, 520, 530 to form the image circle 595 within the one or more image sensors 590. The image circle 595 formed within the one or more image sensors 590 can be a larger, smaller, or the same size as the image circle formed by a lens in the plurality of lenses 500, 510, 520, 530. Additional lenses may be placed between the plurality of lenses 500, 510, 520, 530, and the light deflector 505. Also, additional lenses may be placed between the light deflector 505 and the one or more image sensors 590. The additional lenses may magnify or reduce a plurality of sizes associated with the plurality of image circles 595 formed by the plurality of lenses 500, 510, 520, 530, before the plurality of image circles 595 reaches the one or more image sensors 590.

The light deflector 505 is communicatively coupled to the plurality of shutters 540, 550, 560, 570. The light deflector 505 is actuated and can assume a plurality of positions corresponding to the plurality of lenses 500, 510, 520, 530. Each position in the plurality of positions reflects to the one or more image sensors 590 the image formed by a corresponding lens in the plurality of lenses 500, 510, 520, 530. The light deflector 505 can be a micro-electromechanical systems (MEMS), an actuated mirror, an actuated prism, etc.

The light deflector 505 and the plurality of shutters 540, 550, 560, 570 can be communicatively coupled via a processor. The processor can send an instruction to a shutter in the plurality of shutters 540, 550, 560, 570 to allow a passage of light between the corresponding lens and the light deflector 505. For example, the processor can send an instruction to shutter 540 to allow a passage of light between the lens 500 and the light deflector 505. The processor also can send an instruction to the light deflector 505 to assume the position to reflect the image formed by the lens 500. In one embodiment, the light deflector 505 can include an actuated light deflector and a stationary light deflector, where the actuated light deflector reflects images formed by the lenses that do not have a corresponding stationary light deflector.

Figure 6:
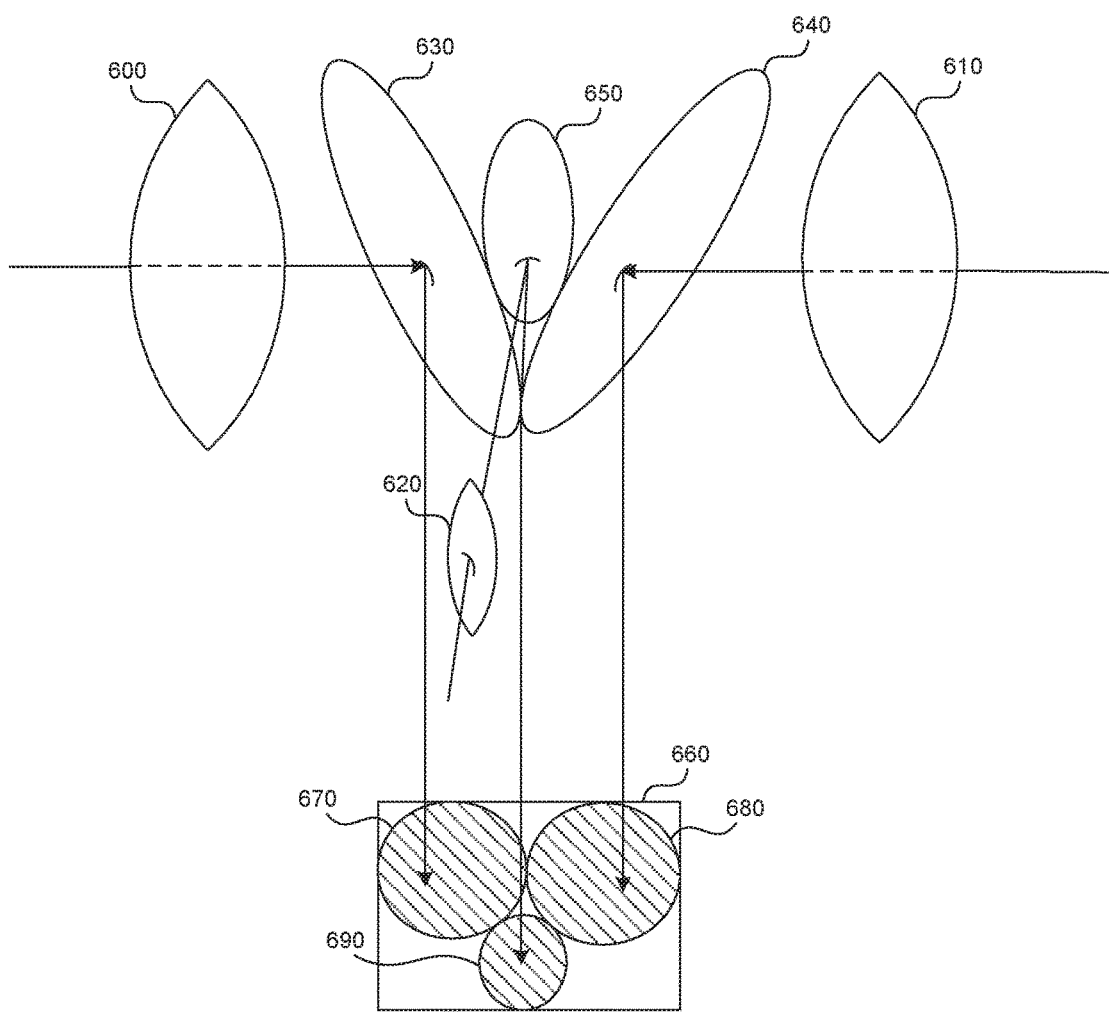
FIG. 6 shows the internal optics of a wide field of view camera, including a stationary light deflector, according to one embodiment.

FIG. 6 shows the internal optics of a wide field of view camera, including a stationary light deflector, according to one embodiment. A plurality of lenses 600, 610, 620 associated with the camera can include lenses of various sizes. Each lens in the plurality of lenses 600, 610, 620 forms an image circle, which can be reflected onto the one or more image sensors 660. The one or more image sensors 660 includes an active image sensor portion configured to record the image formed by the plurality of lenses 600, 610, 620. In FIG. 6, the active image sensor portion includes the shaded area covered by the image circles 670, 680, 690. The plurality of image circles 670, 680, 690 also include an active image circle portion, which is the portion of the plurality of image circles 670, 680, 690 recorded by the one or more image sensors 660. In FIG. 6, the active image circle portion 670, 680, 690 is the shaded area because the whole of the plurality of image circles 670, 680, 690 are recorded by the one or more image sensors 660.

A plurality of light deflectors 630, 640, 650 is disposed proximate to the plurality of lenses 600, 610, 620. The plurality of light deflectors 630, 640, 650 reflect the plurality of incoming image circles from the plurality of lenses to the plurality of light deflectors 630, 640, 650, respectively. The reflected image circles form a plurality of image circles 670, 680, 690 within the one or more image sensors 660. The plurality of image circles 670, 680, 690 correspond to the plurality of light deflectors 630, 640, 650, respectively. The plurality of light deflectors 630, 640, 650 correspond to the plurality of lenses 600, 610, 620, respectively.

The plurality of light deflectors 630, 640, 650 include a plurality of elliptical reflectors angularly disposed with respect to the plurality of lenses 600, 610, 620. The plurality of light deflectors 630, 640, 650 are disposed at substantially a 45° angle with respect to the plurality of lenses 600, 610, 620. The plurality of light deflectors 630, 640, 650 are tangential to each other and are non-overlapping. Because the plurality of light deflectors 630, 640, 650 are tangential to each other and non-overlapping, the plurality of image circles 670, 680, 690 formed by the plurality of light deflectors 630, 640, 650 are tangential, non-overlapping, and enclose a minimal area within the one or more image sensors 660. Additional lenses may be placed between the plurality of lenses 600, 610, 620 and the plurality of light deflectors 630, 640, 650. Also, additional lenses may be placed between the plurality of light deflectors 630, 640, 650 and the one or more image sensors 660. The additional lenses may magnify or reduce a plurality of sizes associated with the plurality of image circles formed by the plurality of lenses 600, 610, 620 before the plurality of image circles reaches the one or more image sensors 660.

In other embodiments, the plurality of light deflectors can take on various others shapes such as a rectangular shape, a prism shape, etc. In such cases, the plurality of image circles formed by the non-elliptical light deflectors are not tangential, and do not enclose a minimal area, because the plurality of image circles include a gap between them. In such a case, to obtain tangential image circles enclosing a minimal area, additional light directing elements must be placed between the plurality of light deflectors 630, 640, 650 and the image sensor 660, such that the plurality of image circles 670, 680, 690 are tangential, non-overlapping, and enclosing a minimal area within the one or more image sensors 660.

Figure 7A:
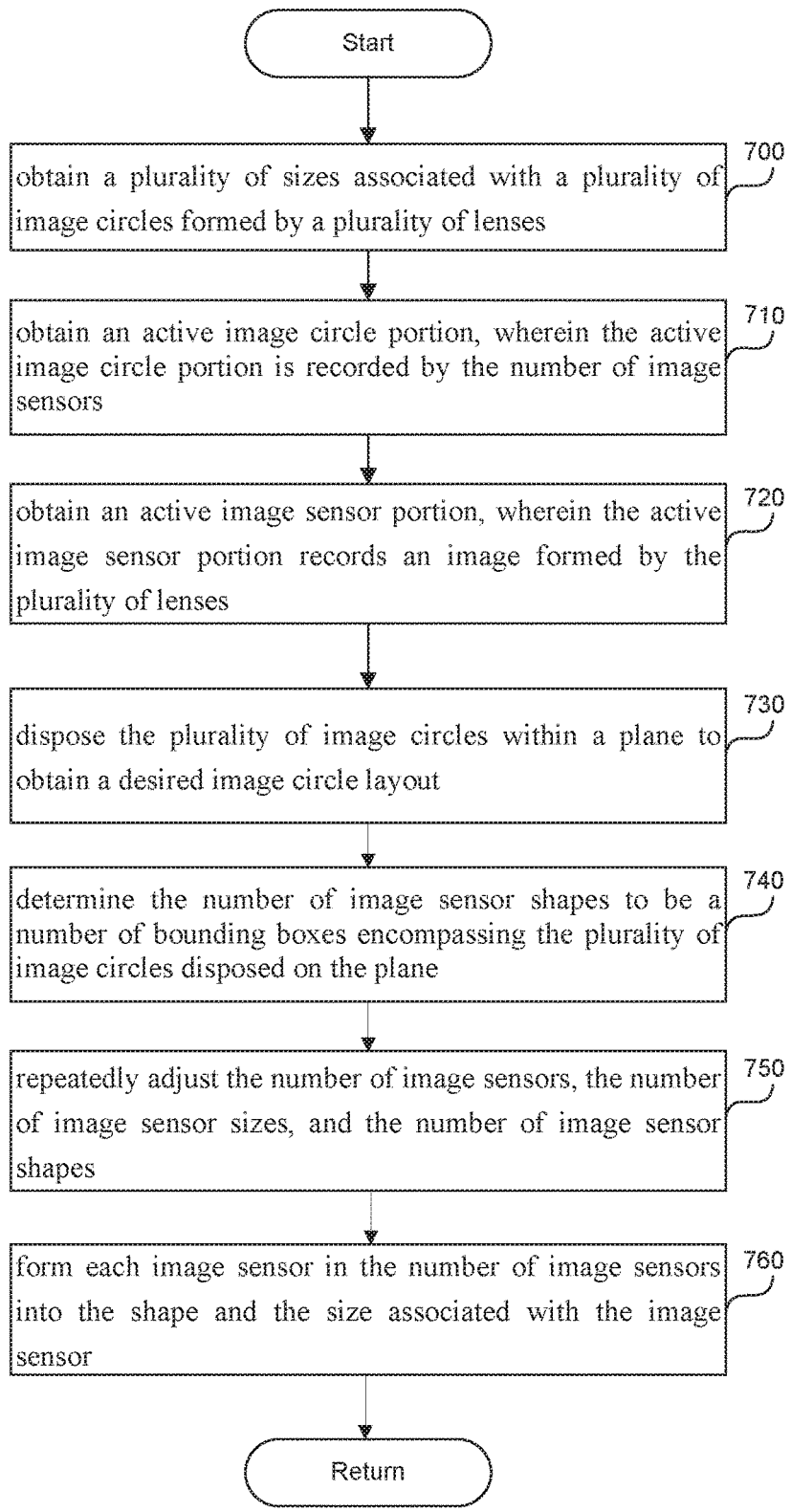
FIG. 7A is a flowchart of a method to determine a number of image sensors, a number of image sensor sizes and a number of image sensor shapes corresponding to the number of image sensors associated with a wide field of view camera, according to one embodiment.

FIG. 7A is a flowchart of a method to determine a number of image sensors, a number of image sensor sizes and a number of image sensor shapes corresponding to the number of image sensors associated with a wide field of view camera, according to one embodiment. In step 700, a processor obtains a plurality of sizes associated with a plurality of image circles formed by a plurality of lenses associated with the wide field of view camera. The processor can obtain the plurality of sizes by automatically measuring the size of each lens in the plurality of lenses. Additionally, the processor can receive the size of each lens in the plurality of lenses from a user or from a database. The sizes of the plurality of image circles can vary because the corresponding lenses in the plurality of lenses can vary in size. For example, some lenses can be wide angle lenses, while some lenses can be normal lenses.

In step 710, the processor obtains an active image circle portion, wherein the active image circle portion is recorded by the number of image sensors. The active image circle portion can be specified as a percentage or a fraction of the full image circle (e.g., 70%, or 8/10).

In step 720, the processor obtains an active image sensor portion, wherein the active image sensor portion records an image formed by the plurality of lenses. The active image sensor portion can be specified as a percentage or a fraction of the image sensor (e.g., 90%, 8.5/10).

In step 730, the processor disposes the plurality of image circles within a plane to obtain a desired image circle layout. The desired image circle layout includes the plurality of image circles that are tangential and non-overlapping. Further, an area encompassed by the plurality of image circles in the desired image circle layout comprises a minimal area.

Disposing the plurality of images can include several steps. First, the processor sorts the plurality of image circles based on the plurality of sizes associated with the plurality of image circles. Next, the processor sequentially disposes the plurality of image circles from largest to smallest within the plane to maximize a number of contacting image circles. To maximize a number of contacting image circles, the processor places the first circle in the plane, and places the second circle tangential to the first circle. If there is a third image circle, the processor places the third image circle tangential to both the first and the second image circle. If there is a fourth image circle, the processor first tries to place the fourth image circle tangential to the previous three image circles. If such a placement is not possible, the processor places the fourth image circle to be tangential to two previously placed image circles. The steps performed for the fourth image circle are performed for all the subsequent circles.

Figure 7B:
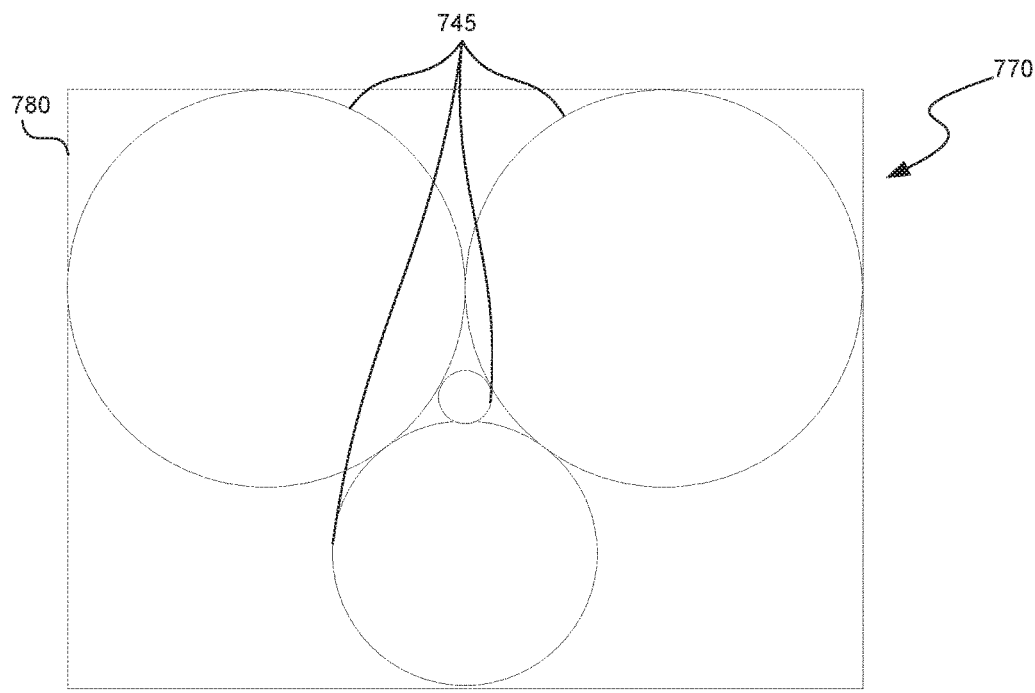
FIG. 7B shows the desired image circle layout for four image circles of various sizes.

FIG. 7B shows the desired image circle layout 770 for four image circles of various sizes. The desired image circle layout 770 includes tangential, non-overlapping circles that encompass a minimal area within a plane.

In step 740, the processor determines the number of image sensor shapes to be a number of bounding boxes encompassing the plurality of image circles disposed on the plane. A bounding box is the smallest rectangular shape encompassing the plurality of image circles disposed on the plane. For example, in FIG. 6, the shape associated with the one or more image sensors 660 is the bounding box encompassing the plurality of image circles 670, 680, 690. In FIG. 7B, rectangle 780 is the bounding box encompassing the plurality of image circles 745 associated with the desired image circle layout 770.

In step 750, the processor repeatedly adjusts the number of image sensors, the number of image sensor sizes, and the number of image sensor shapes until a first condition and a second condition are satisfied. The first condition requires that at least the active image circle portion associated with the plurality of image circles is recorded by the number of image sensors. The second condition requires that at least the active image sensor portion associated with the number of image sensors records the image. In adjusting the number of image sensors, the size, and the shape associated with an image sensor, the processor tends to place the centers of the plurality of image circles in the middle of the number of image sensors so that the active image circle portion comprises the middle of an image circle.

The processor can repeatedly adjust the number of image sensor sizes in various ways. For example, the processor finds a size that satisfies the first condition and reduces the size by a predefined amount, such as 0.01 percent, until both the first condition and the second condition are satisfied. Similarly, the processor can start with a size that satisfies the second condition, and increase the size by a predefined amount, such as 0.01 percent, until both the first condition and the second condition are satisfied.

In another embodiment, instead of increasing or decreasing the size of an initial image sensor size, the processor can adjust the number of image sensor sizes by averaging the maximum size and a minimum size. Initially, the processor determines a maximum size and a minimum size associated with the number of image sensors such that the maximum size satisfies the first condition and the minimum size satisfies the second condition. Next, the processor repeatedly adjusts the maximum size and the minimum size until an average associated with the maximum size and the minimum size satisfies the first condition and the second condition.

Repeatedly adjusting the number of image sensors can include several steps. First, the processor repeatedly adjusts a single image sensor size until the processor determines that the first condition and the second condition cannot be simultaneously satisfied. For example, the processor can determine that the first condition and the second condition cannot be simultaneously satisfied after a predetermined number of size adjustments, such as 100 size adjustments. In another example, the processor can determine that the first condition and the second condition cannot be simultaneously satisfied when two image sensor shapes are within a predefined threshold of each other, such as their areas differ by less than 1%, and when the first image censor shape satisfies the first condition but not the second condition, and the second image censor shape satisfies the second condition but not the first condition.

Once the processor determines that the first condition and the second condition cannot be simultaneously satisfied with one image sensor, the processor creates an additional image sensor. The processor sorts the plurality of image circles based on the plurality of sizes associated with the plurality of image circles. The processor then alternatively disposes within a first plane and a second plane the plurality of image circles from largest to smallest to maximize a number of contacting image circles within the first plane and the second plane. For example, the largest circle is placed within the first plane, the second largest circle is placed within the second plane, the third largest circle is placed within the first plane again, the fourth largest circle is placed within the second plane, etc. The method to maximize the number of contacting image circles is described above.

Once all the circles are placed within the two planes, the processor determines a first image sensor shape to be a first bounding box encompassing the plurality of image circles disposed on the first plane, and the second image censor shape to be a second bounding box encompassing the plurality of image circles disposed on the second plane.

Next, the processor adjusts a first size associated with the first image censor shape, and a second size associated with the second image censor shape until the first condition and the second condition are satisfied. If again the processor determines that the first condition and the second condition cannot be simultaneously satisfied within the first plane and/or within the second plane, the processor repeats the steps described above.

The processor can also determine that satisfying the first and the second condition simultaneously is impossible, in which case the processor sends a notification to the user that the first condition and the second condition cannot be simultaneously satisfied. When the processor is adjusting a size corresponding to a single image sensor, which corresponds to a single image circle in the plurality of image circles, and the processor determines that the first condition and the second condition cannot be simultaneously satisfied, the processor sends the notification to the user.

In step 760 of FIG. 7A, based on the number of image sensors, the number of image sensor shapes, and the number of image sensor sizes, the processor forms each image sensor in the number of image sensors into the shape and the size associated with the image sensor. Forming the number of image sensors into the desired shape and size can be done by cutting a larger image sensor with a laser, diamond saw, or by a chemical process such as etching. For example, the larger image sensor can be covered with an etching resistant film formed into the shape and size of the desired image sensor. Then, the larger image sensor is submerged in a chemical etcher, which edges away parts of the larger image sensor that are not covered with an etching resistant film. Subsequently, the etching resistant film is removed to produce the desired shape and size associated with the image sensor.

In addition to the steps described above, the processor can perform additional steps, such as based on a position associated with the plurality of lenses, and the desired image circle layout, determining a configuration associated with a light deflector such that the plurality of image circles corresponding to the plurality of lenses are formed within the number of image sensors according to the desired image circle layout.

Figure 7C:
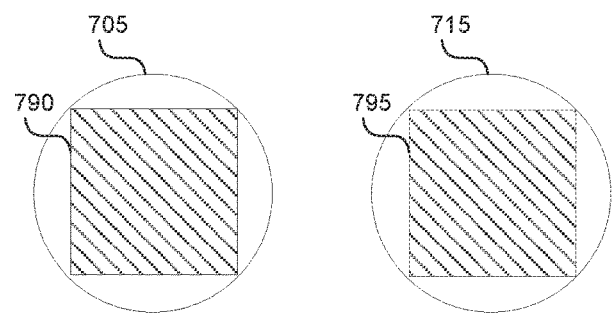
FIGS. 7C-D show various configurations of image sensors and image circles, according to various embodiments.
Figure 7D:
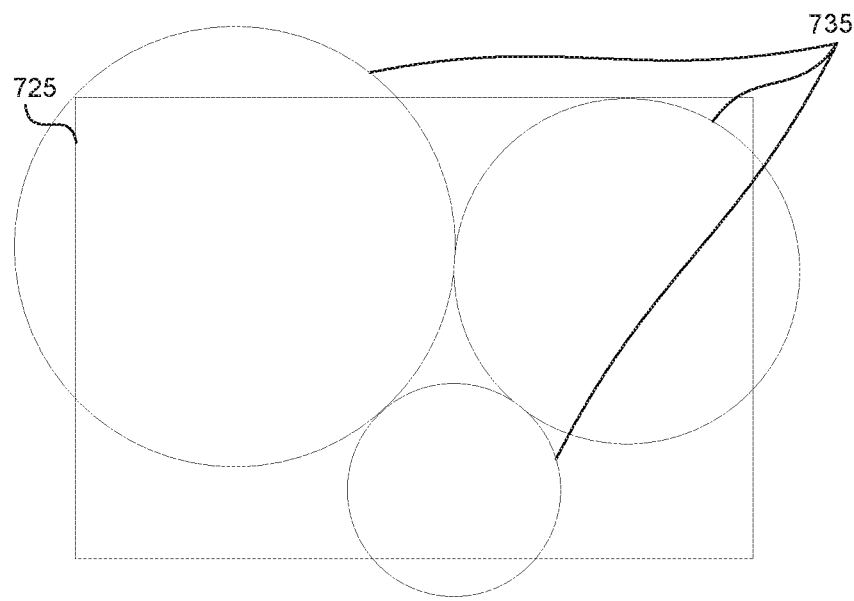

FIGS. 7C-D show various configurations of image sensors and image circles, according to various embodiments. When a user specifies the active image sensor portion to be 100%, and the active image circle portion to be 75%, the processor can calculate the layout shown in FIG. 7C. Here, two image sensors 790, 795 are 100% engaged in recording the image circles. The active image sensor portion corresponds to the shaded area covering the whole of image sensors 790, 795. Two image sensor circles 705, 715 include the active image circle portion, which corresponds to the active image sensor portion. Various other configurations of image sensors and image circles, such as one shown in FIG. 7D, are possible. In FIG. 7D, the plurality of image circles 735 overlaps an image sensor 725.

Figure 8:
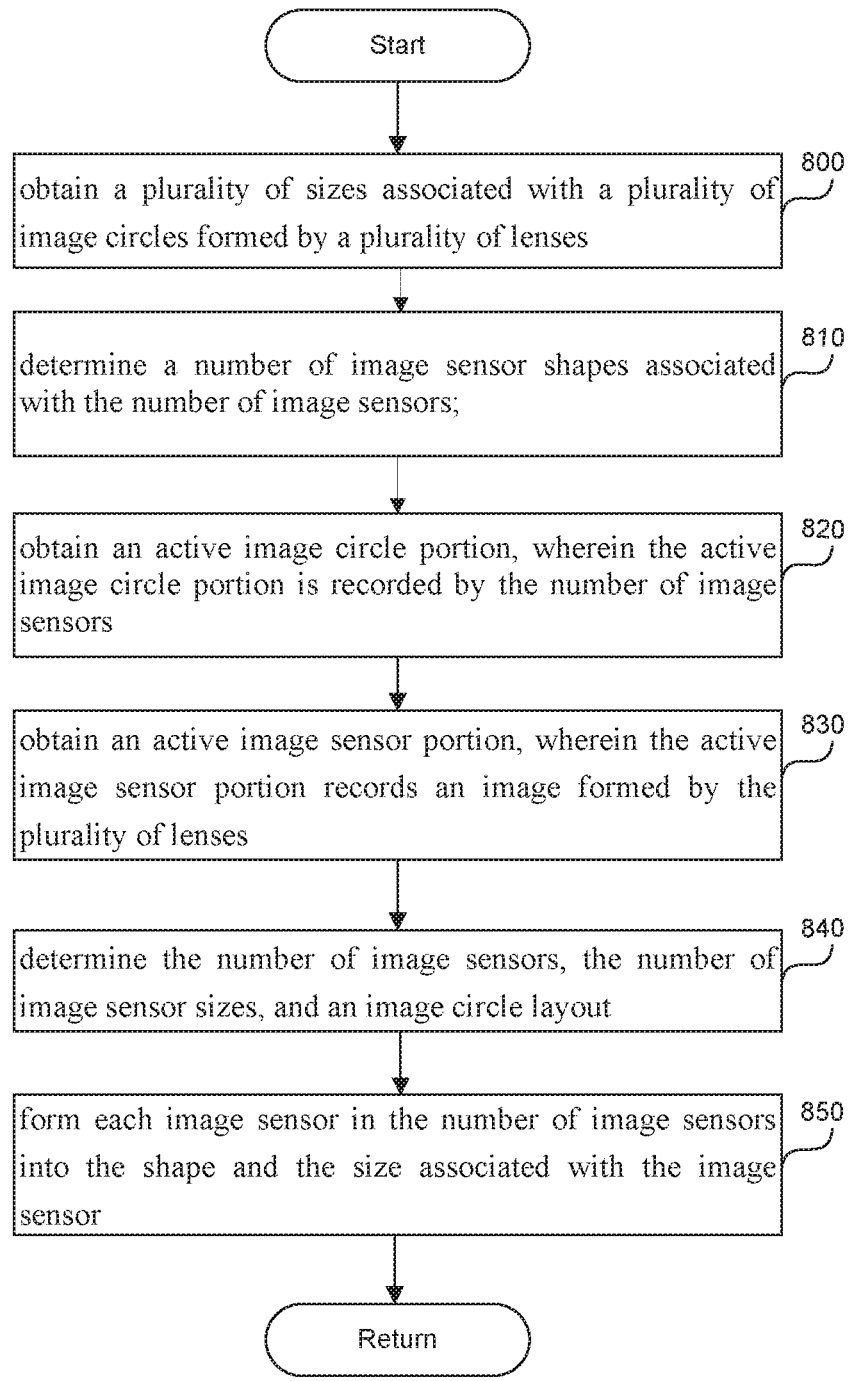
FIG. 8 is a flowchart of a method to determine a number of image sensors and a number of image sensor sizes corresponding to the number of image sensors associated with a wide field of view camera, according to one embodiment.

FIG. 8 is a flowchart of a method to determine a number of image sensors, and a number of image sensor sizes corresponding to the number of image sensors associated with a wide field of view camera, according to one embodiment. In step 800, the processor obtains a plurality of sizes associated with a plurality of image circles formed by a plurality of lenses associated with the wide field of view camera. The processor can obtain the plurality of sizes by automatically measuring the size of each lens in the plurality of lenses. Additionally, the processor can receive the size of each lens in the plurality of lenses from a user, or from a database. The sizes of the plurality of image circles do not have to be the same because the lenses in the plurality of lenses can vary in size. For example, some lenses can be wide-angle lenses, while some lenses can be normal lenses.

In step 810, the processor determines a number of image sensor shapes associated with the number of image sensors. An image sensor shape in the number of image sensor shapes can be rectangular, rectilinear, elliptical, etc. The image sensor shape can be an aspect ratio associated with a rectangle, or an aspect ratio associated with an ellipse. The processor can obtain the number of image sensor shapes from a user, or from a database, or by measuring the shape of a provided image sensor.

In step 820, the processor obtains an active image circle portion associated with the plurality of image circles. The active image circle portion is recorded by the number of image sensors. The active image circle portion can be specified as a percentage or a fraction of the full image circle (e.g., 80%, or 0.97).

In step 830, the processor obtains an active image sensor portion, wherein the active image sensor portion records an image formed by the plurality of lenses. The active image sensor portion can be specified as a percentage or a fraction of the image sensor (e.g., 90%, 7.3/10).

In step 840, the processor—based on the number of image sensor shapes, the plurality of sizes associated with the plurality of image circles, the active image circle portion, and the active image sensor portion—determines the number of image sensors, the number of image sensor sizes, and an image circle layout such that a first condition and a second condition are satisfied. The first condition requires that at least the active image circle portion associated with the plurality of image circles is recorded by the number of image sensors. The second condition requires that at least the active image sensor portion associated with the number of image sensors records the image.

In step 850, based on the number of image sensors, the number of image sensor sizes, and the number of image sensor shapes, each image sensor in the number of image sensors is formed into a corresponding image sensor size and a corresponding image censor shape. Forming the number of image sensors into the desired shape and size can be done by cutting a larger image sensor with a laser or a diamond saw, or by a chemical process such as etching. For example, the larger image sensor can be covered with an etching resistant film formed into the shape and size of the desired image sensor. Then, the larger image sensor is submerged in a chemical etcher, which etches away parts of the larger image sensor that are not covered with an etching resistant film. Subsequently, the etching resistant film is removed to produce the desired shape and size associated with image sensor.

In addition to the steps described above, the processor can perform additional steps, such as based on a position associated with the plurality of lenses, and the desired image circle layout, determining a configuration associated with a light deflector such that the plurality of image circles corresponding to the plurality of lenses are formed within the number of image sensors according to the desired image circle layout.

Figure 9:
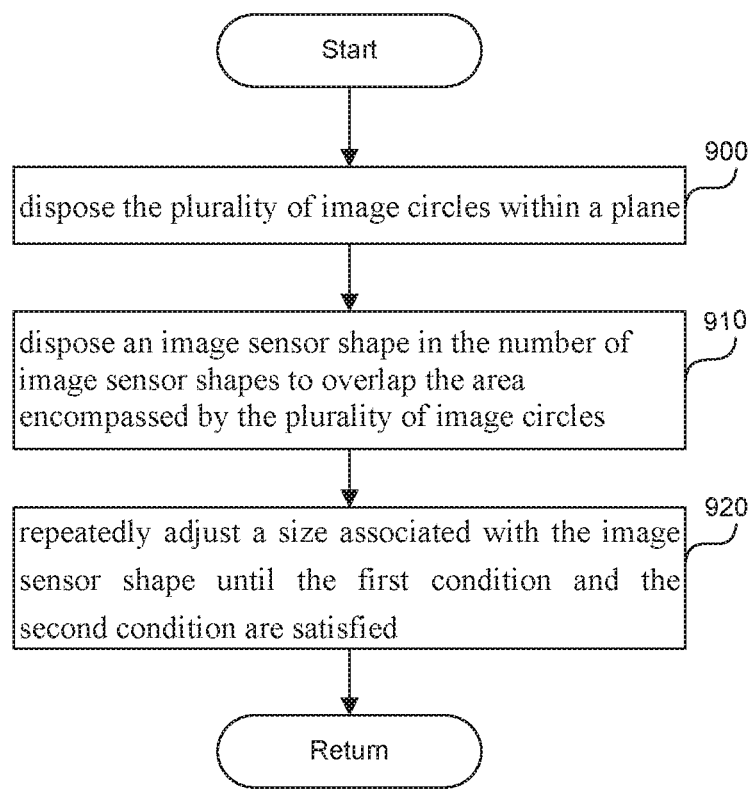
FIG. 9 is a flowchart of a method to determine the number of image sensors, the number of image sensors sizes, and the image circle layout, according to one embodiment.

FIG. 9 is a flowchart of a method to determine the number of image sensors, the number of image sensors sizes, and the image circle layout, according to one embodiment. In step 900, the processor disposes the plurality of image circles within a plane such that the plurality of image circles are tangential and non-overlapping, and such that an area encompassed by the plurality of image circles is minimal. The active image sensor portion corresponds to the plurality of image circles disposed on the plane.

Disposing the plurality of images can include several steps. First, the processor sorts the plurality of image circles based on the plurality of sizes associated with the plurality of image circles. Next, the processor sequentially disposes the plurality of image circles from largest to smallest within the plane to maximize a number of contacting image circles. To maximize a number of contacting image circles, the processor places the first circle in the plane, and places the second circle to be tangential to the first circle. If there is a third image circle, the processor places the third image circle to be tangential to both the first and the second image circle. If there is a fourth image circle, the processor first tries to place the fourth image circle to be tangential to the previous 3 image circles. If such a placement is not possible, the processor places the fourth image circle to be tangential to 2 previously placed image circles. The steps performed for the fourth image circle are performed for all the subsequent circles. FIG. 7B shows the desired image circle layout 770 for four image circles of various sizes. The desired image circle layout 770 includes tangential, non-overlapping circles that encompass a minimal area within a plane.

In step 910, the processor disposes an image sensor shape in the number of image sensor shapes to overlap the area encompassed by the plurality of image circles. The image sensor shape can be specified as an aspect ratio of a rectangle, or an aspect ratio of an ellipse.

In step 920, the processor repeatedly adjusts a size associated with the image sensor shape until a first condition and a second condition are satisfied. Repeatedly adjusting the size associated with the image sensor can be performed in various ways.

According to one embodiment, to adjust the size associated with the image sensor, the processor calculates the size such that the image sensor shape encompasses the plurality of image circles disposed on the plane. The processor repeatedly adjusts the size until the first condition and the second condition are satisfied. When the first condition and the second condition are satisfied, the processor determines the image sensor size.

According to another embodiment, to adjust the size associated with an image sensor, the processor determines that the first condition and the second condition cannot be simultaneously satisfied. Such a determination can be made as described above. The processor disposes within the plane a first shape and a second shape corresponding to a first image sensor and to a second image sensor, respectively. The first shape and the second shape can be rectangles of arbitrary sizes and of the specified aspect ratios, or can be ellipses of arbitrary sizes and of the specified aspect ratios. The processor sorts the plurality of image circles based on the plurality of sizes associated with the plurality of image circles. The processor alternatively disposes within the first shape and the second shape the plurality of image circles from largest to smallest to maximize a number of contacting image circles within the first shape and the second shape, as described above. Lastly, the processor adjusts a first size corresponding to the first shape, and a second size corresponding to the second shape until the first condition and the second condition are satisfied. If again the processor determines that the first condition and the second condition cannot be simultaneously satisfied within the first plane and/or within the second plane, the processor repeats the steps described above.

The processor can also determine that satisfying the first condition and the second condition simultaneously is impossible, in which case the processor sends a notification to the user that the first condition and the second condition cannot be simultaneously satisfied.

According to one embodiment, to adjust the size associated with an image sensor, the processor determines a maximum size and a minimum size associated with the image sensor shape such that the maximum size satisfies the first condition, and the minimum size satisfies the second condition. The processor repeatedly adjusts the maximum size and the minimum size until an average associated with the maximum size and the minimum size satisfies the first condition and the second condition. The size adjustments can be achieved in various other ways described herein.

Computer

Figure 10:
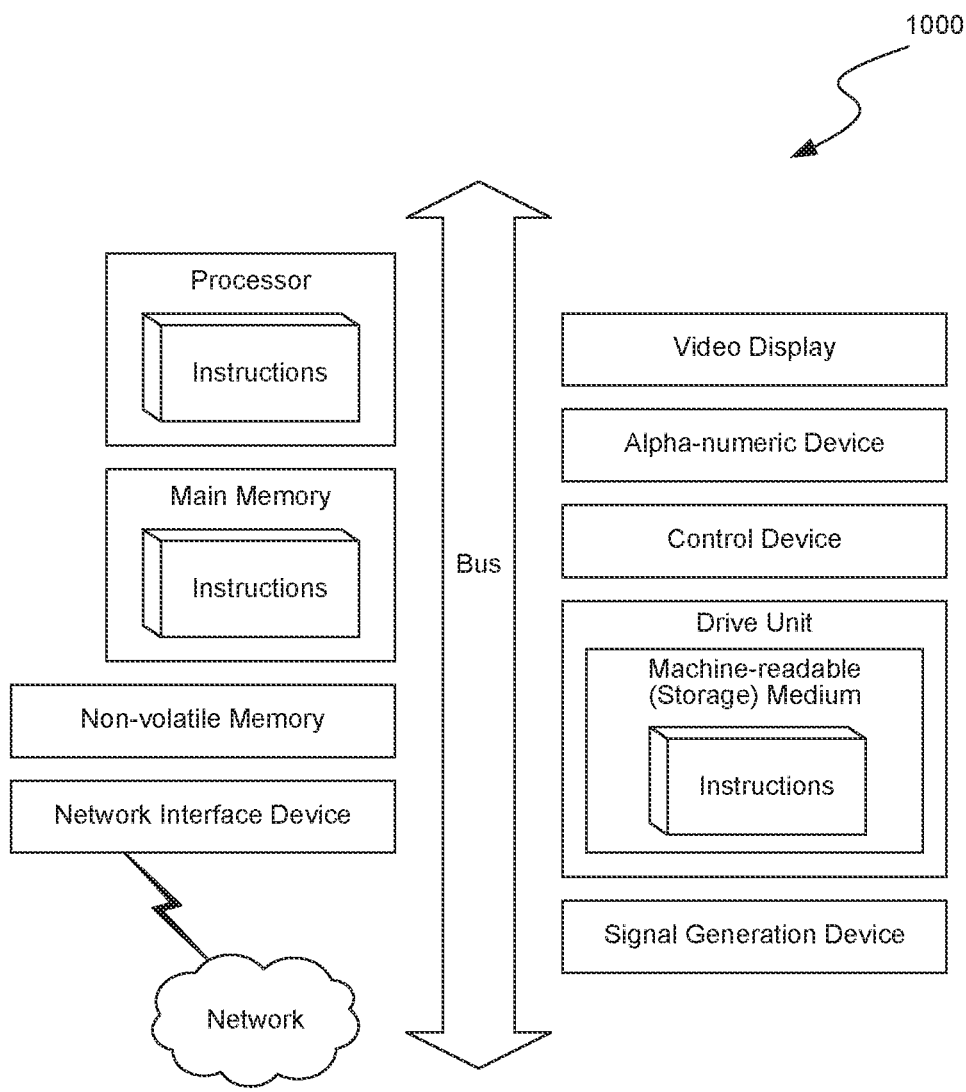
FIG. 10 is a diagrammatic representation of a machine in the example form of a computer system 1000 within which a set of instructions, for causing the machine to perform any one or more of the methodologies or modules discussed herein, may be executed.

FIG. 10 is a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, main memory, non-volatile memory, and a network interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As an example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel® Pentium® microprocessor or Motorola PowerPC™ microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that, for software to run, if necessary, it is moved to a computer readable location appropriate for processing, and, for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or "generating" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer; a client computer; a personal computer (PC); a tablet PC; a laptop computer; a set-top box (STB); a personal digital assistant (PDA); a cellular telephone; an iPhone; a Blackberry; a processor; a telephone; a web appliance; a network router, switch or bridge; or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable-type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission-type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of a charge or a release of a stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state from a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to determine a number of image sensors, a number of image sensor sizes and a number of image sensor shapes corresponding to the number of image sensors associated with a wide field of view camera, the method comprising:
    obtaining a plurality of sizes associated with a plurality of image circles formed by a plurality of lenses associated with the wide field of view camera;
    obtaining an active image circle portion, wherein the active image circle portion is recorded by the number of image sensors;
    obtaining an active image sensor portion, wherein the active image sensor portion records an image formed by the plurality of lenses;
    disposing the plurality of image circles within a plane to obtain a desired image circle layout, wherein the plurality of image circles are tangential and non-overlapping, and wherein an area encompassed by the plurality of image circles comprises a minimal area;
    determining the number of image sensor shapes to be a number of bounding boxes encompassing the plurality of image circles disposed on the plane;
    repeatedly adjusting the number of image sensors, the number of image sensor sizes, and the number of image sensor shapes, until a first condition and a second condition are satisfied, wherein the first condition requires that at least the active image circle portion associated with the plurality of image circles is recorded by the number of image sensors, and wherein the second condition requires that at least the active image sensor portion associated with the number of image sensors records the image; and
    based on the number of image sensors, the number of image sensor shapes, and the number of image sensors sizes, forming each image sensor in the number of image sensors into the shape and the size associated with the image sensor.

2. The method of claim 1, said disposing the plurality of image circles comprising:
    sorting the plurality of image circles based on the plurality of sizes associated with the plurality of image circles;
    sequentially disposing the plurality of image circles from largest to smallest within the plane to maximize a number of contacting image circles.

3. The method of claim 1, repeatedly adjusting the number of image sensors comprising:
    determining that the first condition and the second condition cannot be simultaneously satisfied;
    sorting the plurality of image circles based on the plurality of sizes associated with the plurality of image circles;
    alternatively disposing within a first plane and a second plane the plurality of image circles from largest to smallest to maximize a number of contacting image circles within the first plane and the second plane;
    determining a first image sensor shape to be a first bounding box encompassing the plurality of image circles disposed on the first plane, and the second image censor shape to be a second bounding box encompassing the plurality of image circles disposed on the second plane; and
    adjusting a first size associated with the first image censor shape, and a second size associated with the second image censor shape until the first condition and the second condition are satisfied.

4. The method of claim 3, further comprising:
    adjusting a size corresponding to a single image sensor in the number of image sensors, wherein the single image sensor corresponds to a single image circle in the plurality of image circles;
    determining that the first condition and the second condition cannot be simultaneously satisfied; and
    sending a notification that the first condition and the second condition cannot be simultaneously satisfied.

5. The method of claim 1, repeatedly adjusting the number of image sensor sizes comprising:
    determining a maximum size and a minimum size associated with the number of image sensors such that the maximum size satisfies the first condition and the minimum size satisfies the second condition; and
    repeatedly adjusting the maximum size and the minimum size until an average associated with the maximum size and the minimum size satisfies the first condition and the second condition.

6. The method of claim 1, further comprising:
    based on a position associated with the plurality of lenses, and the desired image circle layout, determining a configuration associated with a light deflector such that the plurality of image circles corresponding to the plurality of lenses are formed within the number of image sensors according to the desired image circle layout.

7. A method to determine a number of image sensors, and a number of image sensor sizes corresponding to the number of image sensors associated with a wide field of view camera, the method comprising:
    obtaining a plurality of sizes associated with a plurality of image circles formed by a plurality of lenses associated with the wide field of view camera;
    determining a number of image sensor shapes associated with the number of image sensors;
    obtaining an active image circle portion associated with the plurality of image circles, wherein the active image circle portion is recorded by the number of image sensors;
    obtaining an active image sensor portion associated with the number of image sensors, wherein the active image sensor portion records an image formed by the plurality of lenses;
    based on the number of image sensor shapes, the plurality of sizes associated with the plurality of image circles, the active image circle portion, and the active image sensor portion, determining the number of image sensors, the number of image sensor sizes, and an image circle layout such that a first condition and a second condition are satisfied, wherein the first condition requires that at least the active image circle portion associated with the plurality of image circles is recorded by the number of image sensors, and wherein the second condition requires that at least the active image sensor portion associated with the number of image sensors records the image; and based on the number of image sensors, the number of image sensor sizes, and the number of image sensor shapes, forming each image sensor in the number of image sensors into a corresponding image sensor size and a corresponding image censor shape.

8. The method of claim 7, said determining the number of image sensors, the number of image sensors sizes, and the image circle layout, comprising:

disposing the plurality of image circles within a plane such that the plurality of image circles are tangential and non-overlapping, and such that an area encompassed by the plurality of image circles is minimal;

disposing an image sensor shape in the number of image sensor shapes to overlap the area encompassed by the plurality of image circles; and repeatedly adjusting a size associated with the image sensor shape until the first condition and the second condition are satisfied.

9. The method of claim 8, said disposing the plurality of image circles comprising:

sorting the plurality of image circles based on the plurality of sizes associated with the plurality of image circles;

sequentially disposing the plurality of image circles from largest to smallest on the plane to maximize a number of contacting image circles.

10. The method of claim 8, said repeatedly adjusting the size associated with the image sensor shape comprising:

calculating the size such that the image sensor shape encompasses the plurality of image circles disposed on the plane;

repeatedly adjusting the size until the first condition and the second condition are satisfied; and when the first condition and the second condition are satisfied, determining the image sensor size.

11. The method of claim 8, said repeatedly adjusting the size associated with the image sensor shape comprising:

determining that the first condition and the second condition cannot be simultaneously satisfied;

disposing within the plane a first shape and a second shape corresponding to a first image sensor and to a second image sensor, respectively;

sorting the plurality of image circles based on the plurality of sizes associated with the plurality of image circles;

alternatively disposing within the first shape and the second shape the plurality of image circles from largest to smallest to maximize a number of contacting image circles within the first shape and the second shape; and adjusting a first size corresponding to the first shape, and a second size corresponding to the second shape until the first condition and the second condition are satisfied.

12. The method of claim 11, further comprising:

adjusting a size corresponding to a single image sensor in the number of image sensors, wherein the single image sensor corresponds to a single image circle in the plurality of image circles;

determining that the first condition and the second condition cannot be simultaneously satisfied; and sending a notification that the first condition and the second condition cannot be simultaneously satisfied.

13. The method of claim 8, said repeatedly adjusting the size corresponding to the image sensor shape comprising:

determining a maximum size and a minimum size associated with the image sensor shape such that the maximum size satisfies the first condition and the minimum size satisfies the second condition; and repeatedly adjusting the maximum size and the minimum size until an average associated with the maximum size and the minimum size satisfies the first condition and the second condition.

14. The method of claim 7, the number of image sensor shapes comprising at least one of an aspect ratio associated with a rectangle, or an aspect ratio associated with an ellipse.

15. The method of claim 7, further comprising:

based on a position associated with the plurality of lenses, and the image circle layout, determining a configuration associated with a light deflector such that the plurality of image circles corresponding to the plurality of lenses are formed within the number of image sensors according to the image circle layout.

16. An apparatus to determine a number of image sensors, and a number of image sensor sizes corresponding to the number of image sensors associated with a wide field of view camera, the apparatus comprising:

a processor;

a non-transitory storage medium storing computer-executable instructions that, when executed by the processor, cause the system to perform a computer-implemented operation, the instructions comprising:

instructions for obtaining a plurality of sizes associated with a plurality of image circles formed by a plurality of lenses associated with the wide field of view camera;

instructions for determining a number of image sensor shapes associated with the number of image sensors;

instructions for obtaining an active image circle portion associated with the plurality of image circles, wherein the active image circle portion is recorded by the number of image sensors;

instructions for obtaining an active image sensor portion associated with the number of image sensors, wherein the active image sensor portion records an image formed by the plurality of lenses;

instructions for—based on the number of image sensor shapes, the plurality of sizes associated with the plurality of image circles, the active image circle portion, and the active image sensor portion—determining the number of image sensors, the number of image sensor sizes, and an image circle layout such that a first condition and a second condition are satisfied, wherein the first condition requires that at least the active image circle portion associated with the plurality of image circles is recorded by the number of image sensors, and wherein the second condition requires that at least the active image sensor portion associated with the number of image sensors records the image; and instructions for—based on the number of image sensors, the number of image sensor sizes, and the number of image sensor shapes—forming each image sensor in the number of image sensors into a corresponding image sensor size and a corresponding image censor shape.

17. The apparatus of claim 16, the instructions for determining the number of image sensors, the number of image sensors sizes, and the image circle layout, comprising:

instructions for disposing the plurality of image circles within a plane such that the plurality of image circles are tangential and non-overlapping, and such that an area encompassed by the plurality of image circles is minimal;

instructions for disposing an image sensor shape in the number of image sensor shapes to overlap the area encompassed by the plurality of image circles; and instructions for repeatedly adjusting a size associated with the image sensor shape until the first condition and the second condition are satisfied.

18. The apparatus of claim 17, instructions for disposing the plurality of image circles comprising:

instructions for sorting the plurality of image circles based on the plurality of sizes associated with the plurality of image circles;

instructions for sequentially disposing the plurality of image circles, from largest to smallest, on the plane to maximize a number of contacting image circles.

19. The apparatus of claim 17, instructions for repeatedly adjusting the size associated with the image sensor shape comprising:

instructions for calculating the size such that the image sensor shape encompasses the plurality of image circles disposed on the plane;

instructions for repeatedly adjusting the size until the first condition and the second condition are satisfied; and instructions for, when the first condition and the second condition are satisfied, determining the image sensor size.

20. The apparatus of claim 17, instructions for repeatedly adjusting the size associated with the image sensor shape comprising:

instructions for determining that the first condition and the second condition cannot be simultaneously satisfied;

instructions for disposing within the plane a first shape and a second shape corresponding to a first image sensor and to a second image sensor, respectively;

instructions for sorting the plurality of image circles based on the plurality of sizes associated with the plurality of image circles;

instructions for alternatively disposing within the first shape and the second shape the plurality of image circles, from largest to smallest, to maximize a number of contacting image circles within the first shape and the second shape; and instructions for adjusting a first size corresponding to the first shape, and a second size corresponding to the second shape until the first condition and the second condition are satisfied.

21. The apparatus of claim 20, the instructions further comprising:

instructions for adjusting a size corresponding to a single image sensor in the number of image sensors, wherein the single image sensor corresponds to a single image circle in the plurality of image circles;

instructions for determining that the first condition and the second condition cannot be simultaneously satisfied; and instructions for sending a notification that the first condition and the second condition cannot be simultaneously satisfied.

22. The apparatus of claim 17, instructions for repeatedly adjusting the size corresponding to the image sensor shape comprising:

instructions for determining a maximum size and a minimum size associated with the image sensor shape such that the maximum size satisfies the first condition and the minimum size satisfies the second condition; and instructions for repeatedly adjusting the maximum size and the minimum size until an average associated with the maximum size and the minimum size satisfies the first condition and the second condition.

23. The apparatus of claim 16, the number of image sensor shapes comprising at least one of an aspect ratio associated with a rectangle, or an aspect ratio associated with an ellipse.

24. The apparatus of claim 16, the instructions further comprising:

instructions for—based on a position associated with the plurality of lenses and the image circle layout—determining a configuration associated with a light deflector such that the plurality of image circles corresponding to the plurality of lenses are formed within the number of image sensors, according to the image circle layout.

* * * * *